US011068918B2

(12) United States Patent
Smid et al.

(10) Patent No.: US 11,068,918 B2
(45) Date of Patent: Jul. 20, 2021

(54) VEHICLE COMMUNICATION SYSTEM

(71) Applicant: MAGNA ELECTRONICS INC., Auburn Hills, MI (US)

(72) Inventors: G. Edzko Smid, Oxford, MI (US); Krishna Koravadi, Rochester Hills, MI (US); Anuj S. Potnis, Pune (IN)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 258 days.

(21) Appl. No.: 15/710,891

(22) Filed: Sep. 21, 2017

(65) Prior Publication Data

US 2018/0082315 A1 Mar. 22, 2018

Related U.S. Application Data

(60) Provisional application No. 62/398,092, filed on Sep. 22, 2016.

(51) Int. Cl.
| | |
|---|---|
| *G06Q 30/00* | (2012.01) |
| *G06Q 30/02* | (2012.01) |
| *G05D 1/00* | (2006.01) |
| *G01C 21/34* | (2006.01) |
| *G01C 21/36* | (2006.01) |
| *B60W 50/08* | (2020.01) |

(52) U.S. Cl.
CPC ......... *G06Q 30/0203* (2013.01); *B60W 50/08* (2013.01); *G01C 21/3484* (2013.01); *G01C 21/362* (2013.01); *G01C 21/3605* (2013.01); *G05D 1/0088* (2013.01); *G06Q 30/0265* (2013.01); *G06Q 30/0266* (2013.01)

(58) Field of Classification Search
CPC ............ G06Q 30/0203; G01C 21/3605; G01C 21/3484; G01C 21/362; G05D 1/0088; B60W 50/08
USPC ......... 705/14.62, 14.49, 14.63, 14.64, 14.67, 705/14.57, 14.58, 14.54
See application file for complete search history.

(56) References Cited

U.S. PATENT DOCUMENTS

| | | |
|---|---|---|
| 5,530,240 A | 6/1996 | Larson et al. |
| 5,668,663 A | 9/1997 | Varaprasad et al. |
| 5,724,187 A | 3/1998 | Varaprasad et al. |
| 6,329,925 B1 | 12/2001 | Skiver et al. |
| 6,360,167 B1 * | 3/2002 | Millington ............. G01C 21/26 342/357.31 |
| 6,477,464 B2 | 11/2002 | McCarthy et al. |

(Continued)

*Primary Examiner* — Luis A Brown
(74) *Attorney, Agent, or Firm* — Honigman LLP

(57) ABSTRACT

A communication system for a vehicle includes a communication device disposed in the vehicle. Responsive to the communication device receiving an input from a vehicle system indicative of a potential service need, the communication device requests an input from the driver of the vehicle pertaining to a desired characteristic of a service provider that can address the potential service need. Responsive to the communication device receiving the input from the driver, the communication system determines a plurality of service providers that (i) can address the potential service need and (ii) has the desired characteristic. The communication device communicates a list of potential service providers to the driver and, responsive to a selection by the driver of a selected service provider, the communication system sets a navigation system of the vehicle to the selected service provider.

16 Claims, 3 Drawing Sheets

(56) References Cited

U.S. PATENT DOCUMENTS

| | | | |
|---|---|---|---|
| 6,505,118 B2* | 1/2003 | Chowanic | G01C 21/3484 |
| | | | 340/906 |
| 6,526,335 B1* | 2/2003 | Treyz | H04W 4/029 |
| | | | 701/1 |
| 6,690,268 B2 | 2/2004 | Schofield et al. | |
| 6,693,517 B2 | 2/2004 | McCarthy et al. | |
| 6,738,711 B2* | 5/2004 | Ohmura | G01C 21/32 |
| | | | 701/451 |
| 6,909,361 B2 | 6/2005 | McCarthy et al. | |
| 7,004,593 B2 | 2/2006 | Weller et al. | |
| 7,167,796 B2 | 1/2007 | Taylor et al. | |
| 7,184,190 B2 | 2/2007 | McCabe et al. | |
| 7,195,381 B2 | 3/2007 | Lynam et al. | |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,329,013 B2 | 2/2008 | Blank et al. | |
| 7,338,177 B2 | 3/2008 | Lynam | |
| 7,370,983 B2 | 5/2008 | DeWind et al. | |
| 7,446,650 B2 | 11/2008 | Scholfield et al. | |
| 7,580,795 B2 | 8/2009 | McCarthy et al. | |
| 7,581,859 B2 | 9/2009 | Lynam | |
| 7,626,749 B2 | 12/2009 | Baur et al. | |
| 7,855,755 B2 | 12/2010 | Weller et al. | |
| 2002/0032035 A1* | 3/2002 | Teshima | G09F 21/04 |
| | | | 455/456.3 |
| 2005/0192008 A1* | 9/2005 | Desai | G06F 21/604 |
| | | | 455/435.2 |
| 2005/0216511 A1* | 9/2005 | Umezu | G01C 21/3682 |
| 2006/0286989 A1* | 12/2006 | Illion | G06Q 30/02 |
| | | | 455/456.3 |
| 2007/0010942 A1* | 1/2007 | Bill | G01C 21/3617 |
| | | | 701/424 |
| 2007/0271035 A1* | 11/2007 | Stoschek | G01C 21/3697 |
| | | | 701/533 |
| 2009/0006194 A1* | 1/2009 | Sridharan | G06Q 30/0273 |
| | | | 705/14.62 |
| 2011/0034147 A1* | 2/2011 | Issa | H04M 1/72457 |
| | | | 455/410 |
| 2011/0087427 A1* | 4/2011 | Liu | G01C 21/3679 |
| | | | 701/532 |
| 2012/0062743 A1 | 3/2012 | Lynam et al. | |
| 2012/0218412 A1 | 8/2012 | Dellantoni et al. | |
| 2013/0222592 A1 | 8/2013 | Gieseke | |
| 2014/0218529 A1 | 8/2014 | Mahmoud et al. | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0199612 A1* | 7/2015 | Segall | G06N 5/04 |
| | | | 706/52 |
| 2015/0251599 A1 | 9/2015 | Koravadi | |
| 2015/0352953 A1 | 12/2015 | Koravadi | |
| 2016/0036917 A1 | 2/2016 | Koravadi et al. | |
| 2016/0117926 A1* | 4/2016 | Akavaram | B60W 40/09 |
| | | | 340/932.2 |
| 2016/0189439 A1* | 6/2016 | Vetterick | G06Q 30/0261 |
| | | | 701/29.4 |
| 2016/0210711 A1* | 7/2016 | Krupa | G16H 40/63 |
| 2016/0210853 A1 | 7/2016 | Koravadi | |
| 2017/0225677 A1* | 8/2017 | Yoshida | B60W 30/025 |

* cited by examiner

VEHICLE COMMUNICATION SYSTEM

CROSS REFERENCE TO RELATED APPLICATION

The present application claims the filing benefits of U.S. provisional application Ser. No. 62/398,092, filed Sep. 22, 2016, which is hereby incorporated herein by reference in its entirety.

FIELD OF THE INVENTION

The present invention relates generally to a vehicle communication system for a vehicle and, more particularly, to a vehicle communication system that communicates with a remote communication system.

BACKGROUND OF THE INVENTION

Communication systems for vehicles may provide for communication between vehicles and/or between a vehicle and a remote server. Such car2car or V2V and car2X or V2X technology provides for communication between vehicles based on information provided by one or more vehicles and/or information provided by a remote server or the like. Examples of such systems are described in U.S. Pat. No. 7,580,795 and/or U.S. Publication Nos. US-2012-0218412, published Aug. 30, 2012, and/or US-2012-0062743, published Mar. 15, 2012, which are hereby incorporated herein by reference in their entireties.

SUMMARY OF THE INVENTION

The present invention provides a communication system for a vehicle that communicates with a remote communication system (remote from the vehicle) and that automatically generates a communication to the driver in response to determining that the vehicle and driver are at a location where the driver may have had a particular experience, such as at a gas station or restaurant or store or the like. The system, upon determining that an experience may have occurred, and responsive to the driver entering the vehicle and/or starting the vehicle, generates a communication to the driver, such as one or more survey questions, for the driver to answer pertaining to the experience. The survey results are stored and communicated to a remote server for providing a database of results pertaining to a particular store or entity for use with future drivers or the like.

These and other objects, advantages, purposes and features of the present invention will become apparent upon review of the following specification in conjunction with the drawings.

DESCRIPTION OF THE PREFERRED EMBODIMENTS

Figure 1:
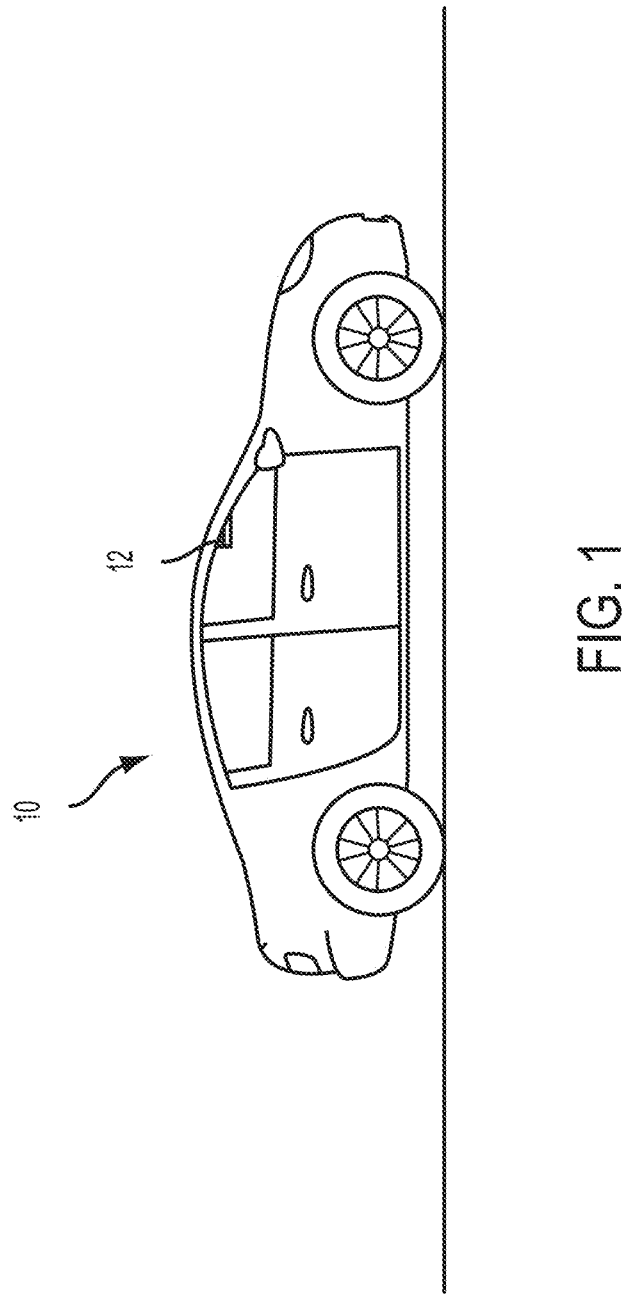
FIG. 1 is a side elevation of a vehicle with a communication system in accordance with the present invention.

A vehicle communication system operates to initiate communications with the driver (or other occupant of the vehicle) to obtain feedback from the driver. As shown in FIG. 1, a vehicle 10 includes a communication system 12, such as a Human-Machine-Interface (HMI) system, that interfaces with the human occupants in the vehicle, and is able to connect to the internet (the Cloud) for access to additional information relating to driving activities.

A driver of a vehicle may use a smart phone via voice input with a vehicle system. It is common known to store points of interest or local properties within offline maps such as navigation systems or online maps such as google Maps® or Here®. The stored properties may be from a nature to be interesting for human users, such as, for example, the current price of liter of gasoline, 95 octane at a specific gas station (associated as local property stored in the map), or the stored properties may be from a nature to be usable as input for an artificial intelligence (AI) system of an autonomous or assistant vehicle, such as, for example, mapping a pothole at a specific spot at a road so that the AI guides the assistant vehicle in a way to avoid the pothole when the vehicle approaches the pothole. Navigation systems and sophisticated vehicle driving assistant systems are uploading local property (AI or machine learning-) inputs automatically.

The communication system of the present invention communicates with a remote communication system (remote from the vehicle) and automatically generates a communication to the driver in response to determining that the vehicle and driver are at a location where the driver may have had a particular experience, such as at a gas station or restaurant or store or the like. The system, upon determining that such an experience has occurred, and responsive to the driver entering the vehicle and/or starting the vehicle, generates a communication to the driver, such as one or more survey questions, for the driver to answer pertaining to the experience. The communication to the driver may be an audible question or questions, where the driver may reply verbally (via an audio and microphone system of the vehicle), or the communication to the driver may be a visual display of one or more questions on a display screen in the vehicle (such as via a navigation screen or backup camera display or touch screen or the like in the vehicle cabin and viewable by the driver of the vehicle), where the driver may reply verbally or may enter or key in a response (by touching a selection or typing in an answer via a keypad at the touch screen). The survey results are stored and communicated to a remote server for providing a database of results pertaining to a particular store or entity for use with future drivers or vehicle occupants or the like.

The communication device may comprise a component of an embedded communication system of the vehicle, such as an ONSTAR® telematics system used in General Motors vehicles, or the communication device may be a portable or mobile communication device, such as a cell phone or smart phone or tablet or computer device or the like, brought into the vehicle, that links (such as wirelessly via BLUETOOTH connection) with a communication system of the vehicle (such as a SYNC® telematics system used in Ford vehicles). Optionally, the communication device may be a component of a car2car (V2V) or car2x (V2X) communication system.

The communication system of the present invention thus provides a vehicle-initiated communication that provides communication to the driver such as based on the geographical location of the vehicle. The system has, instead of a foreign service or instead of the driver, the vehicle initiating a feedback entry [process] from the driver. This is advantageous since the driver is released from taking the initiative when appropriate. Another advantage is that the system interface may guide the driver through the feedback process and guide the feedback to the appropriate social media all automated by its own, so that the driver is minimally bothered, and only needs to execute the requested input entries.

The concept for vehicle-initiated driver feedback relates to a Human-Machine-Interface (HMI) system in a vehicle that interfaces with the human occupants in the vehicle, and is able to connect to the internet (the Cloud) for access to additional information relating to driving activities. This information can be of an objective nature, such as narrow roads, or poor quality road surface, or the like, or could be of a subjective nature, such as "I like this gas station" or "the restrooms were clean", or "the food was good and affordable."

Information from the Cloud is accessed to provide feedback to the driver about current conditions of the trip, or to provide advice about specific accommodations or locations. Similarly, the HMI system is able to inquire from the human occupants their opinion or feedback about the driving experience, or the accommodations, and submit this information back to the Cloud. A service in the Cloud will be able to gather the feedback data and process a statistical average of users' experiences that can subsequently be provided back to the next user.

For example, the system may determine that the vehicle's gas tank was filled up. The system thus concludes that the user (driver) must have stopped at a gas station. When the driver starts the vehicle, the system will provide a quick survey about the gas station, requesting the driver's feedback before continuing on the trip. The feedback could be in the form of yes/no questions: "Did you like this gas station?" "Did you feel safe at the gas station?" "Did you like the amenities at this gas station?", "Did you have to wait long at this gas station?" and/or the like. Or the questions could require an answer in the form of a numerical rating. The driver's feedback is then submitted to the cloud, and associated with the specific gas station (which may be done via associating the location (determined via the vehicle's GPS system) at the time that the system determined that the gas tank was filled up), and the time and date of the driver's experience.

The benefit is that the system of the present invention can provide "opinion"-based information that a system is not able to provide without a human's interaction. Another benefit is that the system of the present invention mitigates legal ramifications for the system's manufacturer, since it provides only a gateway for opinion-based feedback information without providing the actual content of the information.

The system of the present invention provides a method to collect significant feedback about drivers' experiences relating to road side services that people would otherwise not automatically provide. Naturally, people would only post negative feedback when they have a bad experience, and are upset.

Optionally, the system may communicate other survey results (such as from other drivers) pertaining to a particular site (such as a gas station or restaurant or store) at which the vehicle is stopped. For example, responsive to the communication system determining (such as via a GPS system of the vehicle) that the vehicle has arrived at or stopped at a location where the driver would have a particular experience, the communication system may communicate other survey results to the driver of the vehicle before the driver exits the vehicle. For example, if the store or site is very poorly rated by other drivers, the system may alert the driver that the driver has stopped at a poorly rated place so that the driver may elect to move on to a different site.

Optionally, the system may receive vehicle inputs and determine that there may be a need for a particular vehicle system (for example, the vehicle may need fuel or a tire may have a low air pressure), and the system may determine potential destinations or service providers or service stations that are nearby or along a planned route. The system may also receive an input from the driver as to preferred criteria or characteristics of such destinations or service providers (for example, the driver of the vehicle may prefer a service provider that also offers food or the like), and the system may correlate the service need with the preferred criteria to determine one or more service providers that would be acceptable to the driver. The input from the driver pertaining to preferred criteria or characteristics may be accessed from a database of preferred criteria for various types of destinations or service providers as preferred by that driver, or may be received as an input from the driver, such as via a voice command or touch input, in response to a prompt or request from the communication device.

Figure 2:
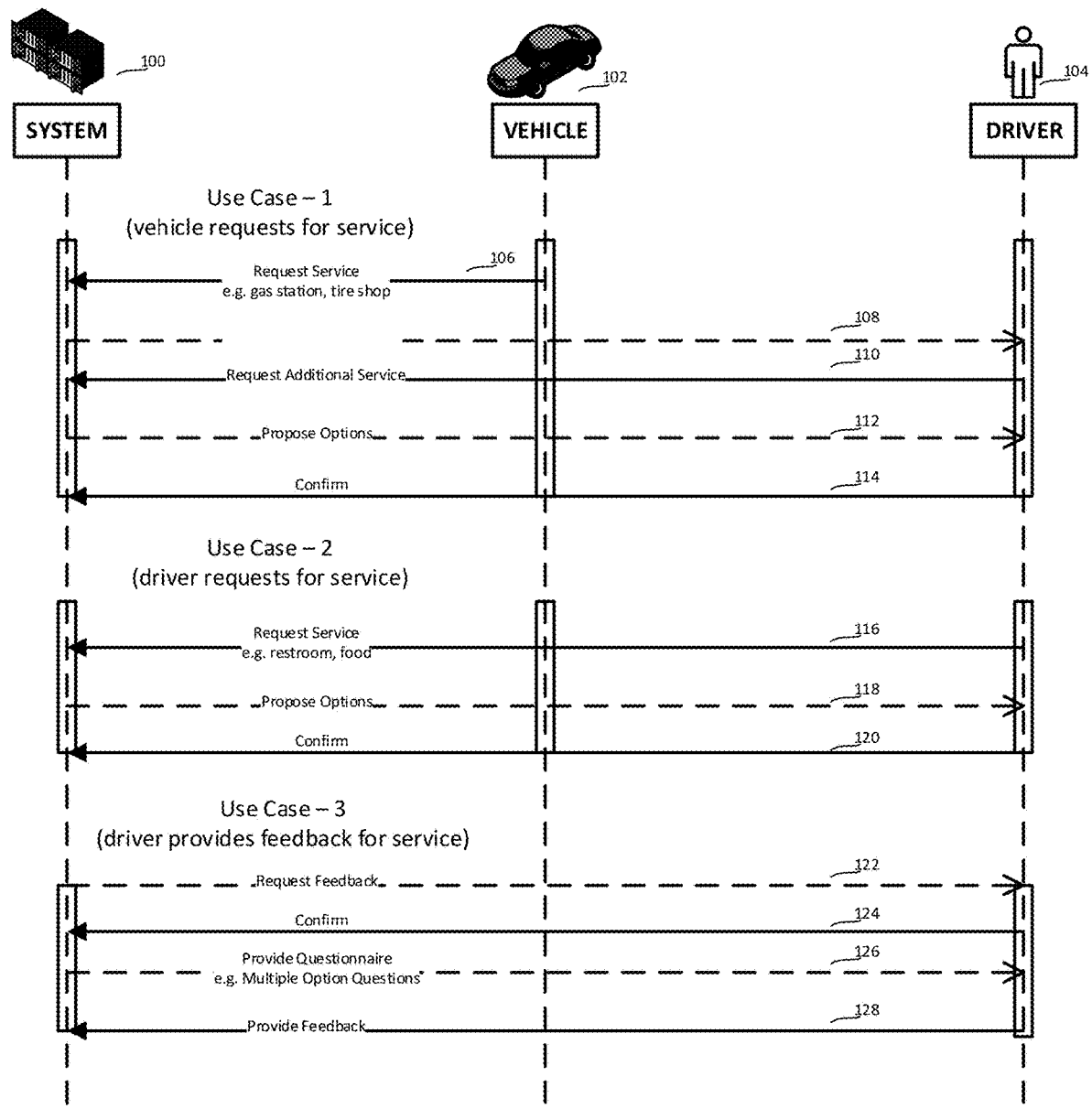
FIG. 2 is a schematic showing various communications between the driver, the communication system, and vehicle systems.

For example, FIG. 2 illustrates the interactions that may take place between the driver 104, the vehicle 102 and the system 100. In a first use situation, the vehicle requests a service 106 based on some indication received from one of the vehicle sensors. For example, if the vehicle is low on gas, it will request a gas station. If the vehicle is low on tire pressure, it will request a tire shop or service station. The system may ask for additional information/service request 108 to the driver. For example, would the driver prefer to stop at a gas station with restrooms or food? This could be a voice command or an HMI question. The driver will request additional services or preferred service station criteria or characteristics 110, again with voice command or HMI. The system will then propose the additional services and options 112, and the driver then selects or confirms one or more of them 114. The system may then set the navigation system to direct or guide the driver or the vehicle to the selected destination or service station or service provider.

In another situation shown in FIG. 2, the driver is requesting a service 116, such as, for example, a restaurant. The system will propose options 118 and the driver will choose and confirm one or more of them 120.

In another situation shown in FIG. 2, the system will request for a feedback based on one or more of the services it recommended 122. The driver confirms participation in the feedback 124. The system then provides the driver with a questionnaire, such as, for example, in the form of multiple choice questions. The driver provides feedback 128 in the form of text, answers to multiple choice questions, ratings or some other means (and such as via voice responses or user inputs).

Figure 3:
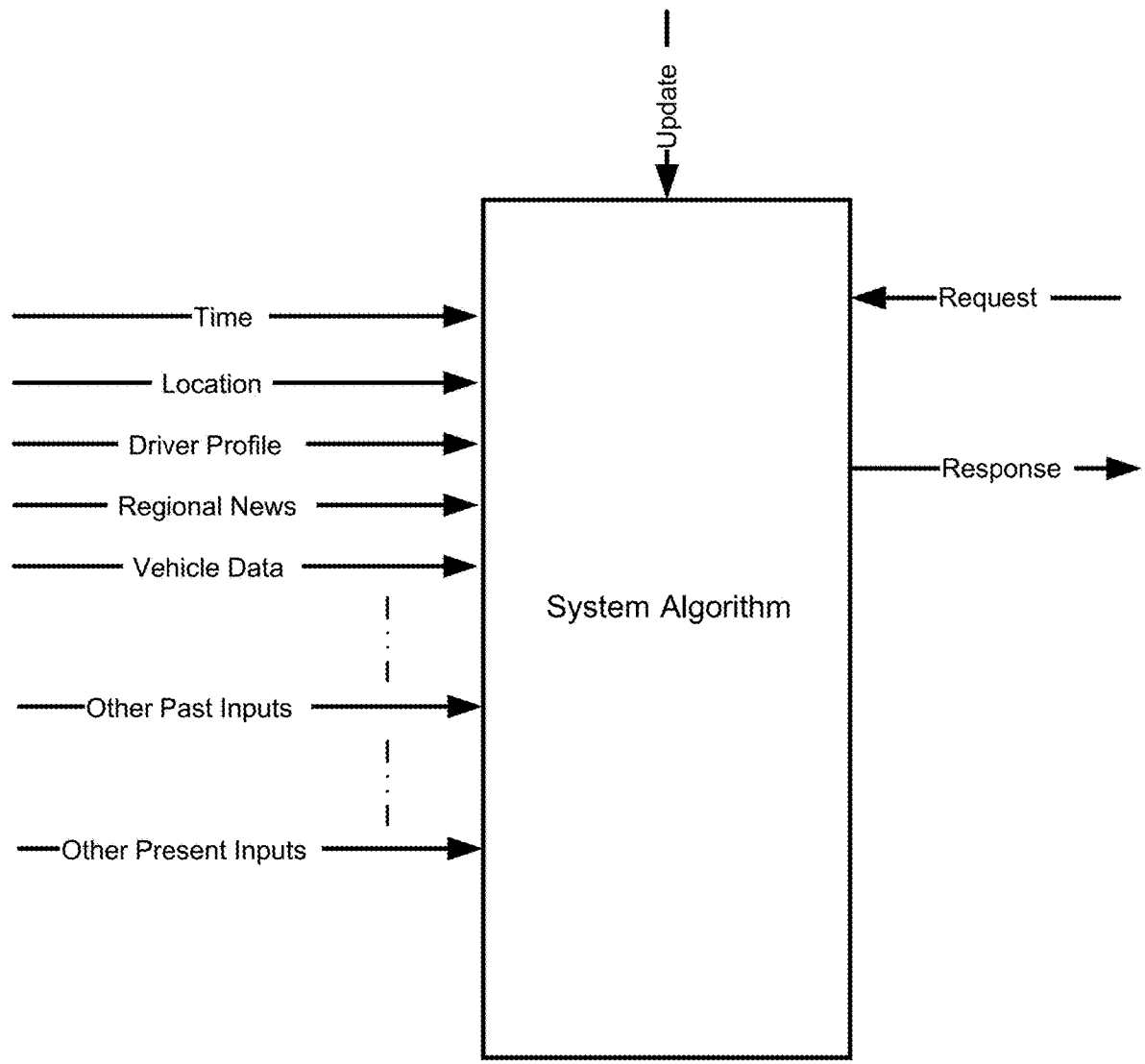
FIG. 3 is a schematic showing the inputs and outputs of the system algorithm of the communication system of the present invention.

FIG. 3 illustrates the algorithm used by the system of the present invention. The system acts like a recommender system based on the input provided by and not limited to vehicle sensors, other sensors, driver information, regional news, driver feedback and/or the like. Based on the input at present and past time, the system responds to the service request from the vehicle and/or driver. For example, the vehicle sensor sends data to the system indicating low gas, whereby the system takes into account the route to find all the gas stations along the route with low detours. Then the system takes into account any driver request or preference to find gas stations which also have food and/or restrooms. In addition, the system may take into account feedback provided by previous drivers for restroom cleanliness, food quality, and overall safety. Therefore, the system may not suggest a gas station if it is not considered safe by other drivers or if the restroom is not clean. The system may weigh the various inputs in selecting the destination. For example, if the vehicle is very low on fuel and may not make it to a further away "preferred" gas station with clean restrooms, the system may select a closer gas station regardless of the ratings.

In another situation, a service may be dependent on the time of the day. For example, it may be closed at that time. Or it may not be safe at night. Hence the system will not recommend that service or location or may make the recommendation with a warning.

Optionally, the system may indicate that a vehicle may be re-fueled prematurely in order to avoid stopping at a later location which may not be considered safe based on certain regional news.

Optionally, the system may defer the survey (or allow the driver to defer the survey) until a later time or at the end of the trip or journey. For example, if the commercial establishment was unsafe, the driver should be able to get out of the place as soon as possible and yet be able to provide feedback after leaving the unsafe place.

Optionally, the system may store data locally until the vehicle approaches or arrives at a place with network connectivity.

Optionally, the system allows the driver to decline feedback or survey. Optionally, the system may ask for feedback only for commercial establishments.

Optionally, the system may communicate with the driver via the driver's smartphone or other mobile device, such that communications may be made when the driver is not in the vehicle, such as when the driver is at a selected location or the like.

Optionally, the communication system may utilize aspects of the systems described in U.S. Pat. Nos. 6,477,464; 7,308,341; 7,167,796 and/or 6,909,361, which are hereby incorporated herein by reference in their entireties.

The system communicates with a remote system and/or may also communicate with other vehicle systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-036917 and/or US-2016-0210853, which are hereby incorporated herein by reference in their entireties.

Optionally, the system may include a display for displaying images captured by one or more of the imaging sensors for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties.

Optionally, the system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A communication system for a vehicle, said communication system comprising:
   a communication device disposed in a vehicle equipped with said communication system;
   wherein, responsive to said communication device receiving an input from a vehicle system of the vehicle indicative of a potential service need of the vehicle, said communication device requests an input from a driver of the vehicle pertaining to a desired characteristic of a service provider that can address the potential service need of the vehicle;
   wherein the input from the vehicle system is indicative of a low fuel level of the vehicle or a low tire pressure of the vehicle;
   wherein the desired characteristic input from the driver comprises one of (i) a request for food service at the service provider, (ii) a clean service provider, and (iii) a request for a restroom at the service provider;
   wherein, responsive to said communication device receiving the input from the driver, said communication system determines a plurality of service providers that (i) can address the potential service need of the vehicle and (ii) has the desired characteristic indicated by the input from the driver;
   wherein said communication device communicates a list of potential service providers to the driver, and wherein the communicated list of potential service providers are service providers from the determined plurality of service providers;
   wherein the service providers provide at least one selected from the group consisting of (i) vehicle fueling service and (ii) tire service; and
   wherein, responsive to a selection by the driver of a selected service provider from the communicated list of potential service providers, said communication system sets a navigation system of the vehicle to the selected service provider.

2. The communication system of claim 1, wherein the desired characteristic input from the driver comprises a safe service provider.

3. The communication system of claim 1, wherein said communication device determines a list of potential service providers responsive at least in part to (i) ratings of potential service providers, (ii) driving conditions and (iii) degree of need for the potential service.

4. The communication system of claim 1, wherein, after the vehicle system has been serviced at the selected service provider, said communication system requests a rating input from the driver of the vehicle to rate the service provider.

5. The communication system of claim 1, wherein, responsive to said communication system determining that the vehicle is at a location where the driver would have a particular experience, said communication device communicates a survey to the driver and receives a reply from the driver, and wherein, responsive to the survey reply from the driver, said communication system wirelessly communicates survey results to a remote server.

6. The communication system of claim 5, wherein the wireless communication is via a vehicle-to-infrastructure communication device.

7. The communication system of claim 5, wherein, responsive to said communication system determining that the vehicle is at one of (i) a gas station, (ii) a store and (iii) a restaurant, said communication device communicates a survey to the driver to have the driver rate the quality of the one of (i) a gas station, (ii) a store and (iii) a restaurant.

8. The communication system of claim 5, wherein said communication system determines that the vehicle is at a location where the driver would have a particular experience in response to a GPS system of the vehicle that determines the current geographical location of the vehicle.

9. The communication system of claim 5, wherein, responsive to said communication system determining that the vehicle is at a location where the driver would have a particular experience, said communication device communicates other survey results to the driver of the vehicle before the driver exits the vehicle.

10. The communication system of claim 5, wherein said communication device determines the location responsive to a vehicle input and a driver input.

11. The communication system of claim 5, wherein, responsive to the survey reply from the driver, said communication system locally stores survey results in a memory device of said communication system, and later wirelessly communicates the survey results to the remote server.

12. A communication system for a vehicle, said communication system comprising:
a communication device disposed in a vehicle equipped with said communication system;
wherein, responsive to said communication device receiving an input from a vehicle system of the vehicle indicative of a potential service need of the vehicle, said communication device requests an input from a driver of the vehicle pertaining to a desired characteristic of a service provider that can address the potential service need of the vehicle;
wherein the input from the vehicle system is indicative of a low fuel level of the vehicle or a low tire pressure of the vehicle;
wherein the desired characteristic input from the driver comprises one of (i) a request for food service at the service provider, (ii) a clean service provider, and (iii) a request for a restroom at the service provider;
wherein, responsive to said communication device receiving the input from the driver, said communication system determines a plurality of service providers that (i) can address the potential service need of the vehicle and (ii) has the desired characteristic indicated by the input from the driver;
wherein said communication device determines a list of potential service providers responsive at least in part to (i) ratings of potential service providers, (ii) driving conditions and (iii) degree of need for the potential service;
wherein said communication device communicates the determined list of potential service providers to the driver, and wherein the communicated list of potential service providers are service providers from the determined plurality of service providers;
wherein the service providers provide at least one selected from the group consisting of (i) vehicle fueling service and (ii) tire service;
wherein, responsive to a selection by the driver of a selected service provider from the communicated list of potential service providers, said communication system sets a navigation system of the vehicle to the selected service provider; and
wherein, after the vehicle system has been serviced at the selected service provider, said communication system requests a rating input from the driver of the vehicle to rate the service provider.

13. The communication system of claim 12, wherein the desired characteristic input from the driver comprises a safe service provider.

14. The communication system of claim 12, wherein the input from the driver pertaining to a desired characteristic is an input by the driver in response to a prompt from said communication device.

15. A communication system for a vehicle, said communication system comprising:
a communication device disposed in a vehicle equipped with said communication system;
wherein, responsive to said communication device receiving an input from a vehicle system of the vehicle indicative of a potential service need of the vehicle, said communication device requests an input from a driver of the vehicle pertaining to a desired characteristic of a service provider that can address the potential service need of the vehicle;
wherein the input from the vehicle system is indicative of a low fuel level of the vehicle or a low tire pressure of the vehicle;
wherein the desired characteristic input from the driver comprises one of (i) a request for food service at the service provider, (ii) a clean service provider, and (iii) a safe service provider;
wherein, responsive to said communication device receiving the input from the driver, said communication system determines a plurality of service providers that (i) can address the potential service need of the vehicle and (ii) has the desired characteristic indicated by the input from the driver;
wherein said communication device determines a list of potential service providers responsive at least in part to (i) ratings of potential service providers, (ii) driving conditions and (iii) degree of need for the potential service and wherein the communicated list of potential service providers are service providers from the determined plurality of service providers; and
wherein said communication device communicates the determined list of potential service providers to the driver, and wherein, responsive to a selection by the driver of a selected service provider from the communicated list of potential service providers, said communication system sets a navigation system of the vehicle to the selected service provider.

16. The communication system of claim 15, wherein the input from the driver pertaining to a desired characteristic is an input by the driver in response to a prompt from said communication device.

\* \* \* \* \*